US006783136B2

United States Patent
Pronsias Timoney et al.

(10) Patent No.: US 6,783,136 B2
(45) Date of Patent: Aug. 31, 2004

(54) MODULAR BALL-JOINT ASSEMBLY

(75) Inventors: Eanna Pronsias Timoney, Navan (IE); Seamus Brennan, Trim (IE)

(73) Assignee: Technology Investments Limited, Navan (IE)

( * ) Notice: Subject to any disclaimer, the term of this patent is extended or adjusted under 35 U.S.C. 154(b) by 0 days.

(21) Appl. No.: 10/137,278

(22) Filed: May 3, 2002

(65) Prior Publication Data

US 2002/0163151 A1 Nov. 7, 2002

(30) Foreign Application Priority Data

May 3, 2001 (IE) .......................................... S2001/0438

(51) Int. Cl.[7] ................................................ B62D 7/20
(52) U.S. Cl. ............................. 280/93.511; 280/93.512; 280/124.136; 403/122
(58) Field of Search ....................... 280/93.511, 93.512, 280/124.141, 124.135, 125.136; 403/122, 135, 134, 141, 142

(56) References Cited

U.S. PATENT DOCUMENTS

| | | | |
|---|---|---|---|
| 2,611,625 A | * | 9/1952 | Kishline et al. ...... 280/124.109 |
| 4,111,571 A | | 9/1978 | Farrant |
| 4,271,922 A | * | 6/1981 | Kishline ...................... 180/254 |
| 4,848,788 A | * | 7/1989 | Rumpel ................ 280/124.138 |
| 5,395,176 A | * | 3/1995 | Zivkovic ...................... 403/122 |
| 5,758,986 A | | 6/1998 | Kraps |
| 5,772,352 A | | 6/1998 | Fukumoto et al. |
| 6,287,040 B1 | | 9/2001 | Fischer |
| 6,402,169 B1 | * | 6/2002 | Schafer et al. .......... 280/93.512 |

FOREIGN PATENT DOCUMENTS

| EP | 0460423 A1 | * | 12/1991 |
|---|---|---|---|
| EP | 0 832 769 A2 | | 4/1998 |

* cited by examiner

*Primary Examiner*—Charles T. Jordan
*Assistant Examiner*—T. Nguyen
(74) *Attorney, Agent, or Firm*—Birch, Stewart, Kolasch & Birch, LLP

(57) ABSTRACT

An independent suspension system has a pair of control arms having inner ends which are attached to a vehicle body and outer ends which support a wheel hub therebetween. A ball joint interconnects each control arm with the wheel hub. Each ball joint has a ball pin rotatably mounted in an associated housing. A first threaded shank on the ball pin is bolted to one of the control arm and the wheel hub. A second threaded shank on the housing is bolted to the other of the control arm and the wheel hub. Thus each ball joint is a separate unit which is demountable from the control arm and wheel hub and can be installed without dismantling the ball joint. Conveniently also a threaded shank of the ball joint may screw into a complementary threaded socket in a control arm to allow adjustment of the effective length of the control arm.

17 Claims, 2 Drawing Sheets

MODULAR BALL-JOINT ASSEMBLY

BACKGROUND OF THE INVENTION

1. Field of the Invention

This invention relates to independent suspension systems for vehicles.

2. Description of the Related Art

Independent suspension systems for vehicles frequently employ one or two control arms (also referred to as wishbones or A-arms) to locate a wheel hub carrier or steering knuckle with respect to the vehicle chassis and to allow movement of the wheel in a generally vertical direction. A spring, that can be virtually any type of spring such as a coil spring or a pneumatic spring, opposes the upward movement of the wheel. The inboard end of each control arm is connected to the vehicle body by an articulated bearing or joint, while the outboard end is connected in each case to the wheel hub carrier by a second articulated bearing or joint so as to form a four bar linkage. Frequently, the spring is of an axial type such as a coil spring or a hydropneumatic strut, such that the spring deflection is along the same axis as the spring force, and has its upper end connected to the vehicle body, while its lower end is connected to one of the two control arms. To allow the wheel to steer, the articulated joint at the outboard end of each control arm can be a ball-joint. Alternative suspension arrangements, such as the well known McPhearson strut suspension, use a single suspension control arm.

In automobile applications, loads and ball joint articulation can be accommodated relatively easily. However, In heavy duty, high mobility truck applications, suspension articulations and suspension loads can be extreme (up to 500 mm and 6 tonnes static with a 5 g dynamic component). In such situations, accommodation of suitably sized ball joints with adequate articulation and load bearing capacity presents a severe challenge. Traditionally, ball joints have been mounted directly on the control arms or the stub axle, and a suitable seal arrangement provided. Such arrangements cause difficulties in fitting, servicing and inhibit angulations. Alternatively, the seal may be self-contained on the ball joint. This arrangement results in very large bore requirement for fitting into the stub axle or control arm and inhibits articulation.

In the prior art European Patent Specification No. 0832769 discloses a stabiliser link rod with integral sockets at each end, each of which houses a ball stud. In U.S. Pat. No. 6,287,040 there is disclosed a ball and socket joint in which the ball pin is shaped to co-operate with a sealing boot to prevent ingress of dirt. A further type of ball joint is described in U.S. Pat. No. 5,772,352 which has a pair of spaced-apart bearing sheets for supporting a ball within a socket. With use and wear the bearing sheets will come together and further wear results in play in the ball joint giving an indication of wear and prompting replacement. In U.S. Pat. No. 6,758,986 there is disclosed a device for securing a bearing shell. In a housing of a ball joint. U.S. Pat. No. 4,111,571 discloses a ball and socket joint with means for detecting wear in the joint. In all of the aforementioned patent specifications me housing for the ball pin is integral with a link element such as a steering control arm, stabiliser, link rod, knuckle or the like.

SUMMARY OF THE INVENTION

According to the invention, there is provided an independent suspension system, including:

at least one control arm, the or each control arm having an inner end and an outer end, the inner end for connection by means of a first articulating joint to a vehicle body and the outer end for connection to a wheel hub by means of a second articulating joint for mounting the wheel hub on the vehicle body, spring means for mounting between the control arm or one of the control arms and the vehicle body, the second articulating joint comprising a ball joint having a ball pin rotatably mounted in a complementary ball housing, the ball pin having a spherical ball head with a shank extending outwardly therefrom, the ball head being rotatably mounted and sealed within the complementary ball housing with the ball pin shank projecting outwardly from the ball housing, said ball housing having an opening through which the ball pin projects, a seal being mounted between the ball pin shank and the ball housing to seal said opening, first connector means for releasably engaging an outer free end of the shank with one of the control arm and the wheel hub and second connector means for releasably engaging the ball housing with the other of the control arm and the wheel hub.

Advantageously each ball joint at an outer end of the control arm or arms is a separate unit which is demountable from the control arm and the wheel hub and can be installed without dismantling the ball joint. Thus there is no possibility for dirt and other foreign matter to get into the ball joint when fitting the ball joint. Also the fitting of the ball joint is simplified as it is only a matter of attaching the two connectors between the ball joint and the control arm and wheel hub.

In one embodiment of the invention connector means is provided for engagement of a control arm with the ball joint in a manner which allows adjustment of the effective length of the control arm.

In another embodiment the control arm and the ball joint are releasably interengagable by means of a two-part threaded connector having a first part comprising a threaded bore and a second part comprising a threaded shank for complementary threaded engagement within the bore, one part being on the control arm and the other part being on the ball joint.

In a further embodiment the threaded bore is provided in the control arm and the threaded shank is provided on the ball joint. The threaded shank may be provided on the ball housing extending outwardly therefrom.

In another embodiment the threaded bore is provided on the ball joint and the threaded shank is provided on the control arm.

In a preferred embodiment, two control arms are provided, namely, an upper control arm and a lower control arm for mounting between the vehicle body and the wheel hub to support the wheel hub on the vehicle body.

In another embodiment, the control arm has a threaded bore adjacent ant outer end of the control arm for reception of a complementary threaded shank which projects outwardly of the housing. Thus, the ball joint can be screwed onto the end of the control arm and this conveniently allows length adjustment of the control arm.

In an alternative arrangement, the control arm has a threaded shank adjacent an outer end of the control arm for engaging with a complementary threaded bore in the housing.

In a further embodiment, the control arm and/or the wheel hub has a through hole for reception of the shank of the ball joint which is engagable within the hole with an outer threaded end of the shank projecting therethrough and being secured on the control arm or hub by a locknut.

Preferably, an intermediate portion of the shank is tapered and a bore of the through hole is tapered for mating engagement with the tapered shank portion.

In another embodiment the ball housing has a socket for reception of the ball pin, the socket having an inner end and an outer end, an annular stop being provided at the inner end of the socket, said annular step defining the opening in the ball housing through which the ball pin projects, a bearing mounted within the socket for rotatably supporting the ball head within the socket, the outer end of the socket having a threaded outer bore portion, a retaining nut being engagable within the complementary threaded outer bore portion of the socket to secure the bearing within the socket, the retaining nut engaging an outer end of the bearing to clamp the bearing between the retaining nut and the annular step at the inner end of the socket.

In another aspect the invention provides a modular ball joint assembly, including:

- a ball pin rotatably mounted in a complementary ball housing,
- the ball pin having a spherical ball head with a shank extending outwardly therefrom,
- the ball head being rotatably mounted and sealed within the complementary ball housing with the ball pin shank projecting outwardly from the ball housing,
- said ball housing having an opening through which the ball pin projects,
- a seal being mounted between the ball pin shank and the ball pin housing to seal said opening,
- the ball housing having a socket for reception of the ball pin,
- the socket having an inner end and an outer end,
- an annular step being provided at the inner end of the socket,
- said annular step defining the opening in the ball housing through which the ball pin projects,
- a bearing mounted within the socket for rotatably supporting the ball head within the socket,
- the outer end of the socket having a threaded outer bore portion,
- a retaining nut being engagable within the complementary threaded outer bore portion of the socket to secure the bearing within the socket,
- the retaining nut engaging an outer end of the bearing to clamp the bearing between the retaining nut and the annular step at the inner end of the socket,
- a threaded connector shank projecting laterally outwardly from a side of the ball housing.

BRIEF DESCRIPTION OF THE DRAWINGS

The invention will be more clearly understood by the following description of some embodiments thereof, given by way of example only, With reference to the accompanying drawings, in which.

DETAILED DESCRIPTION OF THE PREFERRED EMBODIMENTS

Figure 1:
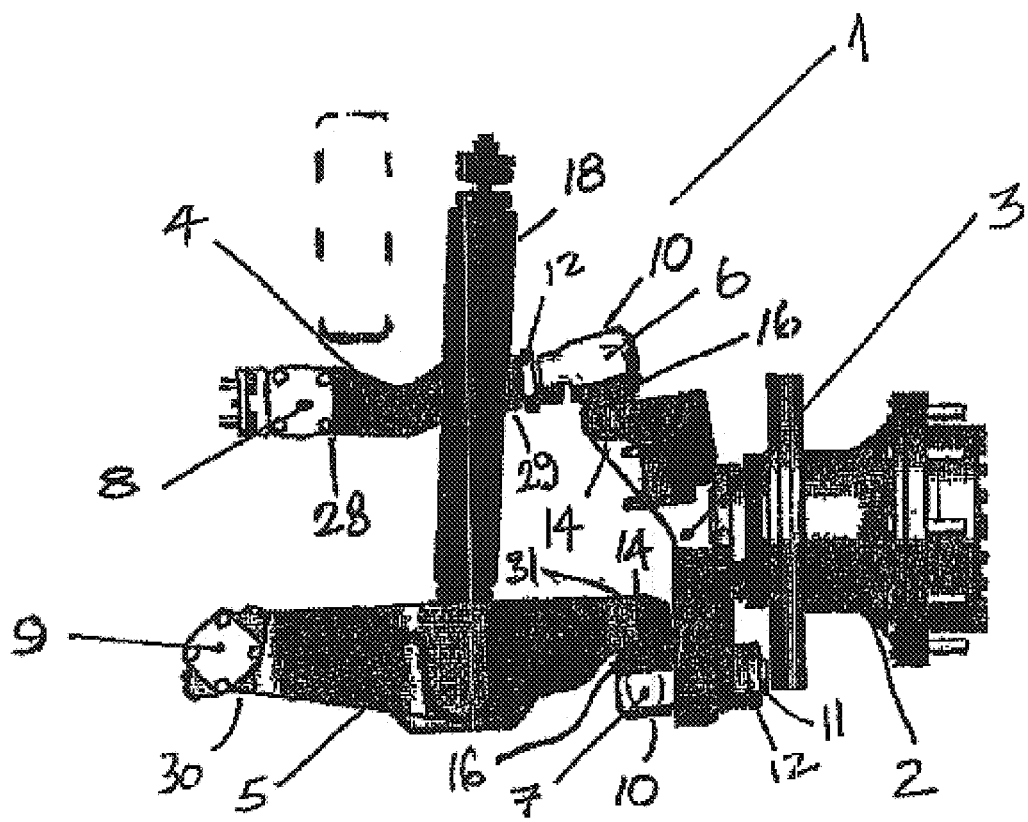
FIG. 1 is an elevational view of an independent suspension system according to the invention.
Figure 2:
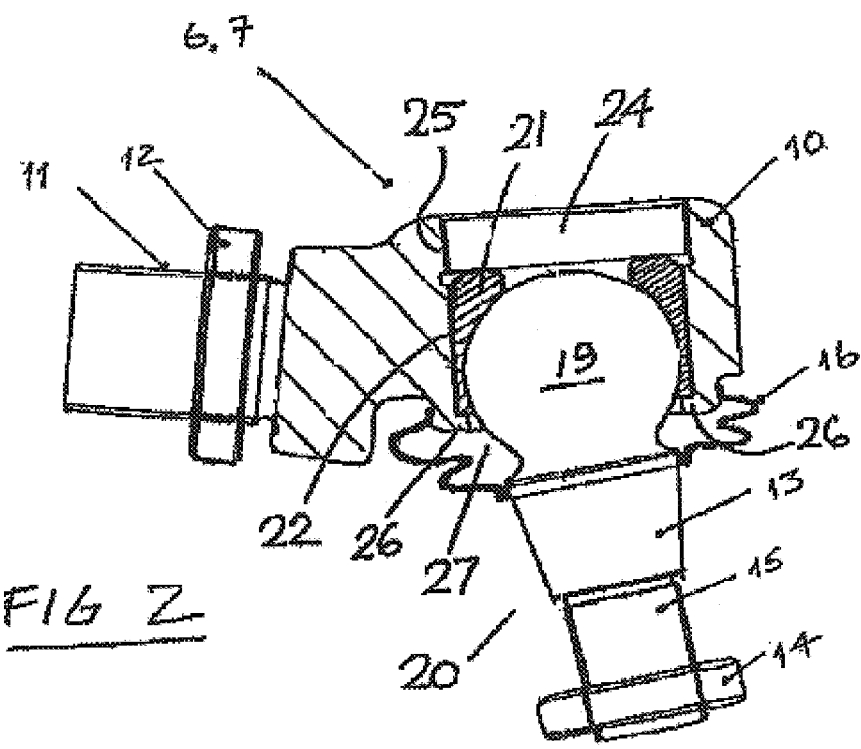
FIG. 2 is a detail sectional elevational view of a modular ball-joint assembly forming portion of the independent suspension system of the invention.
Figure 3:
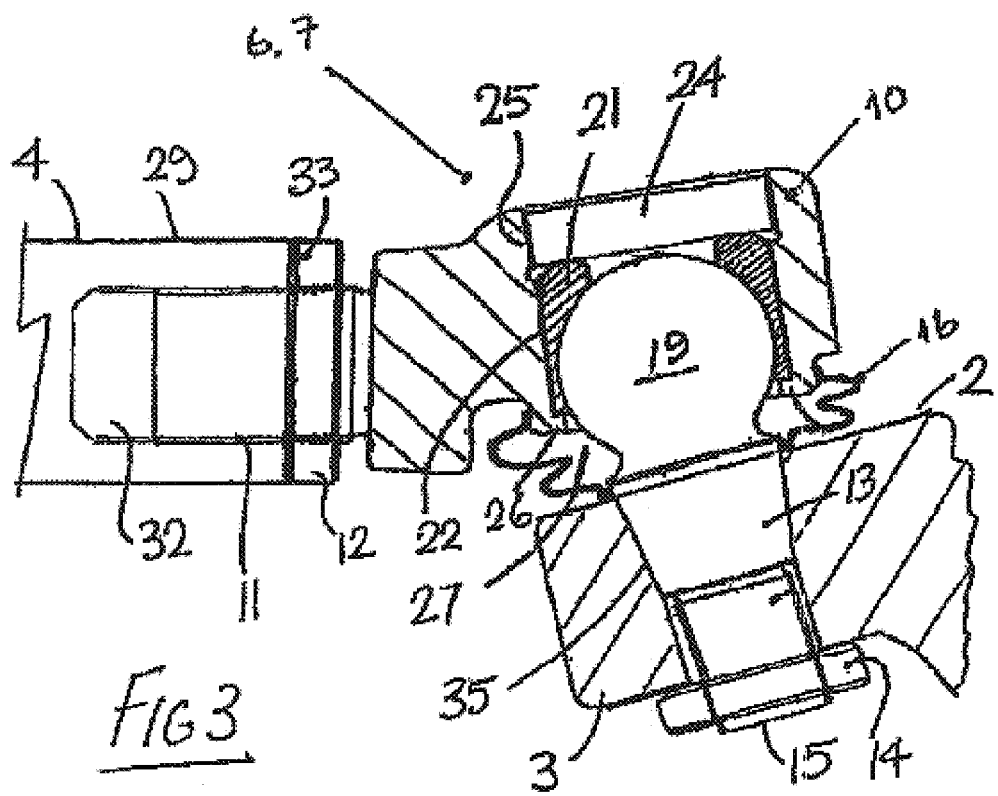
FIG. 3 is a detail sectional elevational view showing the mounting of the ball-joint in the suspension system.

Referring to the drawings, and initially to FIGS. 1 to 3 thereof, there is illustrated an independent suspension system according to the invention, indicated generally by the reference numeral 1. The independent suspension system 1 has an upper control arm 4 having an inner end 28 for connecting to a vehicle body (not shown) at an articulating joint 8 and an outer end 29 for connecting to a knuckle 3 of a wheel hub assembly 2 at an articulating joint 6. A lower control arm 5 has an inner end 30 which connects to the vehicle body at an articulating joint 9 and an outer end 31 which connects to the knuckle 3 at articulating joint 7. The knuckle 3 carries the wheel hub assembly 2 which can be driven or non-driven. If driven, it may incorporate a reduction gearbox. In the case of a non-steering wheel, articulating joints 6 and 7 may be cylindrical joints. However, to allow the wheel to steer, it is preferable that articulating joints 6 and 7 be spherical or ball joints. A spring 18 extends between the lower control arm 5 and the vehicle body.

A modular ball-joint assembly according to the invention for forming each of the outer articulating joints 6, 7 is shown in more detail in FIG. 2. A ball housing 10 is fixed to either a control arm 4, 5 or to the knuckle 3 with a threaded shank 11 which projects laterally outwardly on one side of the ball housing 10. In the arrangement shown in FIG. 1, this threaded shank 11 on me upper ball joint assembly 6 is screwed into the upper control arm 4 which has a complementary threaded socket 32 at the outer end 29 for reception of the threaded shank 11. The socket 32 extends axially inwardly into the control arm. By varying the depth to which the ball housing shank 11 is screwed into the control arm 4, the effective kinematic length of the control arm 4 may be altered. A lock nut 12 is used to look the shank 11 at the appropriate length being engagable against the end face 33 of the control arm 4. A ball pin 20 has a spherical ball head 19 and a tapered shank 13 that seats in an associated tapered hole 35 in knuckle 3 and rigidly connects the ball pin 20 to the knuckle 3 with lock nut 14 screwed onto an outer threaded cylindrical shank 15 of the ball pin 20.

The ball head 19 is rotatably supported in a bearing 21 which is mounted in an associated socket 22 in the ball housing 10. The bearing 21 is secured within the ball housing 10 by a retaining nut 24 which screws into a threaded outer bore portion 25 of the socket 22 against an outer end of the bearing 21. An inner end of the bearing 21 seats against an annular step 26 at an inner end of the socket 22 which defines an opening 27 through which the ball pin 20 projects. Thus, the bearing 21 is securely damped within the socket 22 between the nut 24 and the step 26.

In the arrangement shown in FIG. 1, the lower ball joint assembly 7 is connected in the reverse fashion, that is to say that the ball housing 10 is clamped to the knuckle 3 by tightening nuts 12 on the threaded shank 11 which is passed through a hole in the knuckle 3 while the tapered shank 13 of the ball pin 20 of the joint rigidly connects the ball pin 20 to the outer end 31 of the lower control arm 5.

The entire modular ball joint 6, 7 can be supplied as a unit that may be pre-greased and sealed with a rubber boot 16 which extends between the shank 13 and an exterior of the ball housing 10.

Figure 4:
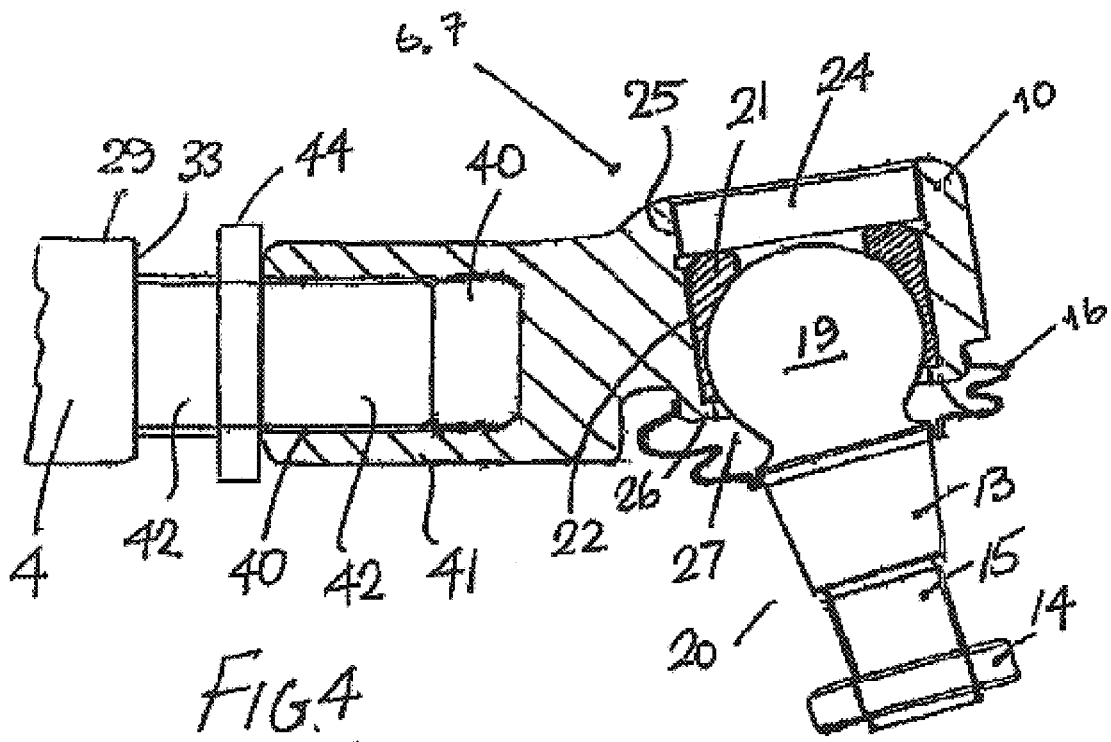
FIG. 4 is a view similar to FIG. 3 showing an alternative mounting arrangement for the ball joint.

Referring now to FIG. 4 an alternative arrangement of the connector between the ball housing 10 and the outer end 29 of the upper control arm 4 is shown. Parts similar to those described previously are assigned the same reference numerals. In this case a threaded bore 40 is provided in a laterally extending arm 41 of the ball housing 10. A complementary threaded shank 42 projects axially outwardly of the end face 33 at the outer end 29 of the upper control arm 4. This threaded shank 42 engages within the bore 40. By varying the depth to which the shank 42 is screwed into the bore 40 on the ball housing 10 the affective kinematic length of the control arm 4 may be altered. A locknut 44 on the shank 42 engages against an outer end face of the arm 41 to releasably lock the control arm 4 in engagement with the ball housing 10.

The invention is not limited to the embodiments hereinbefore described which may be varied in both construction and detail within the scope of the appended claims.

What is claimed is:

1. An independent suspension system, including:

at least one control arm, the at least one control arm having an inner end and an outer end, the inner end of the at least one control arm for connection by means of a first articulating joint to a vehicle body and the outer end of the at least one control arm for connection to a wheel hub by means of a second articulating joint for mounting the wheel hub on the vehicle body, spring means for mounting between the at least one control arm and the vehicle body, the second articulating joint comprising a ball joint having a ball pin rotatably mounted in a ball housing, the ball pin having a spherical ball head with a shank extending outwardly therefrom, the ball head being rotatably mounted and sealed within the ball housing with the ball pin shank projecting outwardly from the ball housing, said ball housing having an opening through which the ball pin projects, a seal being mounted between the ball pin shank and the ball housing to seal said opening, first connector means for releasably engaging an outer free end of the ball pin shank with one of the at least one control arm and the wheel hub and second connector means for releasably engaging the ball housing with the other of the at least one control arm and the wheel hub.

2. An independent suspension system as claimed in claim 1 wherein the second connector means is provided for engagement of the at least one control arm with the ball joint, said second connector means having means for adjustment of the effective length of the at least one control arm.

3. An independent suspension system as claimed in claim 2 wherein the at least one control arm and the ball joint are releasably interengagable by said second connector means which comprises a two-part threaded connector having a first part comprising a threaded bore and a second part comprising a threaded shank for complementary threaded engagement within the bore, one of said threaded bore and said threaded shank being on the control arm and the other of said threaded bore and said threaded shank being on the ball joint.

4. An independent suspension system as claimed in claim 3 wherein the threaded bore is provided in the control arm and the threaded shank is provided on the ball joint.

5. An independent suspension system as claimed in claim 4 wherein the threaded shank is on the ball housing.

6. An independent suspension system as claimed in claim 3 wherein the threaded bore is provided on the ball joint and the threaded shank is provided on the control arm.

7. An independent suspension system as claimed in claim 1 wherein two control arms are provided, namely, an upper control arm and a lower control arm for mounting between the vehicle body and the wheel hub to support the wheel hub on the vehicle body.

8. An independent suspension system as claimed in claim 1 wherein the at least one control arm has a through hole for reception of a shank of the ball pin which is engagable within the hole to form the first connector means, said shank of the ball pin having an outer threaded end, said outer threaded end of the ball pin shank projecting through said hole for engagement by a locknut to secure the ball pin in engagement with said at least one control arm.

9. An independent suspension system as claimed in claim 1 wherein the wheel hub has a through hole for reception of a shank on the ball housing which is engagable within the hole to form the second connector means, said shank on the ball housing being a threaded shank, an outer end of said threaded shank on the ball housing projecting through the hole in the wheel hub for engagement by a locknut to secure the ball housing in engagement with the wheel hub.

10. An independent suspension system as claimed in claim 8 wherein an intermediate portion of the ball pin shank is tapered and a bore of the through hole is tapered for mating engagement with the tapered intermediate portion of the ball pin shank.

11. An independent suspension system as claimed in claim 1 wherein the ball housing has a socket for reception of the ball pin, the socket having an inner end and an outer end, an annular step being provided at the inner end of the socket, said annular step defining the opening in the ball housing through which the ball pin projects, a bearing mounted within the socket for rotatably supporting the ball head within the socket, the outer end of the socket having a threaded outer bore portion, a retaining nut being engagable within the threaded outer bore portion of the socket to secure the bearing within the socket, the retaining nut engaging an outer end of the bearing to clamp the bearing between the retaining nut and the annular step at the inner end of the socket.

12. An independent suspension system, including:

at least one control arm, the at least one control arm having an inner end and an outer end, the inner end of the at least one control arm for connection by means of a first articulating joint to a vehicle body and the outer end of the at least one control arm for connection to a wheel hub by means of a second articulating joint for mounting the wheel hub on the vehicle body, spring means for mounting between the at least one control arm and the vehicle body, the second articulating joint comprising a ball joint having a ball pin rotatably mounted in a ball housing, the ball pin having a spherical ball head with a shank extending outwardly therefrom, the ball head being rotatably mounted and sealed within the ball housing with the ball pin shank projecting outwardly from the ball housing, said ball housing having an opening through which the ball pin projects, a seal being mounted between the ball pin shank and the ball housing to seal said opening, first connector means for releasably engaging an outer free end of the ball pin shank with one of the at least one control arm and the wheel hub and second connector means for releasably engaging the ball housing with the other of the at least one control arm and the wheel hub, the second connector means being provided for engagement of the at least one control arm with the ball joint, said second connector means having means for adjustment of the effective length of the at least one control arm.

13. An independent suspension system as claimed in claim 12 wherein the second connector means comprises a two-part threaded connector having a first part comprising a threaded bore and a second part comprising a threaded shank for complementary threaded engagement within the bore, one of said threaded bore and said threaded shank being on the control arm and the other of said threaded bore and said threaded shank being on the ball joint.

14. An independent suspension system as claimed in claim 13 wherein the threaded bore is provided in the control arm and the threaded shank is provided on the ball joint.

15. An independent suspension system as claimed in claim 14 wherein the threaded shank is on the ball housing.

16. An independent suspension system including:

at least one control arm, the at least one control arm having an inner end and an outer end, the inner end of the at least one control arm for connection by means of a first articulating joint to a vehicle body and the outer end of the at least one control arm for connection to a wheel hub by means of a second articulating joint for mounting the wheel hub on the vehicle body, spring means for mounting between the at least one control arm and the vehicle body, the second articulating joint comprising a ball joint having a ball pin rotatably mounted in a ball housing, the ball pin having a spherical ball head with a shank extending outwardly therefrom, the ball head being rotatably mounted and sealed within the ball housing with the ball pin shank protecting outwardly from the ball housing, said ball housing having an opening through which the ball pin projects, a seal being mounted between the ball pin shank and the ball housing to seal said opening, the wheel hub having a through hole for reception of the ball pin shank which projects therethrough and is secured on the wheel hub by a locknut which engages a threaded outer end of the ball pin shank, a second threaded shank being provided on the ball housing and projecting outwardly therefrom for threaded engagement within a complementary threaded socket at an outer end of the at least one control arm, a locknut engaging with the second threaded shank and with an outer end of the control arm to secure the ball housing on the control arm.

17. An independent suspension system, including:

a pair of control arms, namely an upper control arm and a lower control arm, each control arm having an inner end and an outer end, the inner end of each control arm for connection by means of a first articulating joint to a vehicle body, and the outer end of each control arm for connection to a wheel hub by means of a second articulating joint for mounting the wheel hub on the vehicle body, spring means for mounting between one of said control arms and the vehicle body, the second articulating joint comprising a ball joint having a ball pin rotatably mounted in a ball housing, the ball pin having a spherical ball head with a shank extending outwardly therefrom, the ball head being rotatably mounted and sealed within the ball housing with the ball pin shank projecting outwardly from the ball housing, said ball housing having an opening through which the ball pin projects, a seal being mounted between the ball pin shank and the ball housing to seal said opening, a first ball joint for connecting the outer end of the upper control arm to the wheel hub, a second ball joint for connecting the outer end of the lower control arm to the wheel hub, the upper control arm having a threaded bore at an outer end thereof for reception of a complementary threaded shank projecting outwardly from the ball housing of the first ball joint, and the ball pin shank projecting through a complementary through hole in the wheel hub and being secured to the wheel hub by a locknut which engages a threaded end of the ball pin shank of said first ball joint, the lower control arm having a through hole at an outer end thereof for reception of the ball pin shank of the second ball joint which is secured on the lower control arm by a locknut which engages a threaded outer end of the ball pin shank of said second ball joint, the second ball joint having a threaded shank projecting outwardly from the ball housing for engagement within an associated through hole in the wheel hub and being secured on the wheel hub by a locknut which engages with an outer end of the threaded shank on the ball housing which projects through the hole in the wheel hub.

* * * * *